Patented Dec. 31, 1946

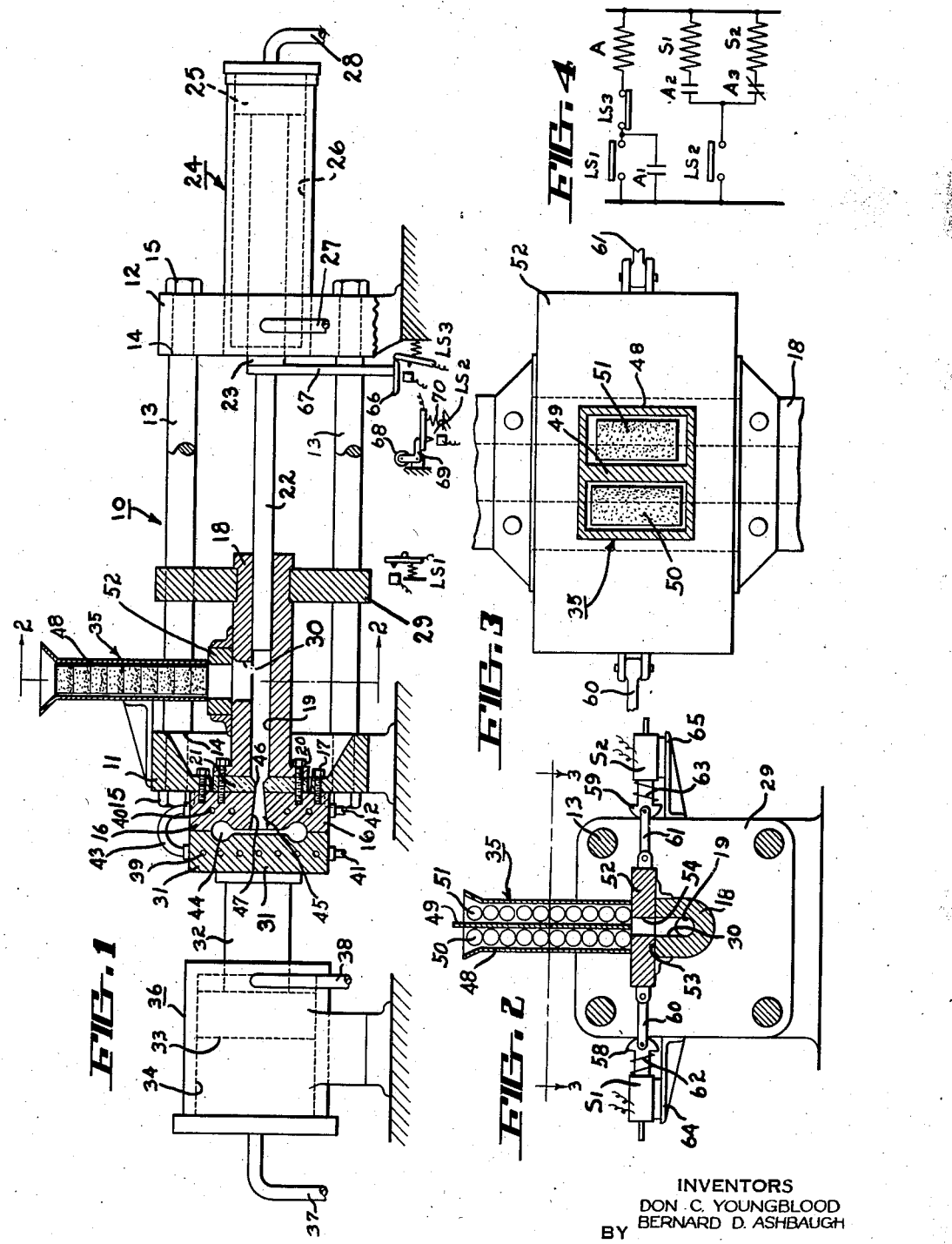

2,413,401

UNITED STATES PATENT OFFICE 2,413,401

APPARATUS FOR FEEDING PREFORMS TO INJECTION MACHINES

Don C. Youngblood, Chicago, Ill., and Bernard D. Ashbaugh, Mount Gilead, Ohio, assignors to The Hydraulic Development Corp., Inc., Wilmington, Del., a corporation of Delaware Application July 26, 1943, Serial No. 496,104

9 Claims. (Cl. 18—30)

This invention relates to injection molding machines.

An object of the invention is to provide an injection molding machine that is constructed and arranged in a manner to handle preformed pellets of different size that are automatically fed into the injection cylinder of the machine, the size of the preformed pellet that is fed into the cylinder being controlled according to the stroke of the injection plunger of the machine.

Another object of the invention is to provide an injection machine wherein plastic material in pellet or briquette form is fed through an injection cylinder without any substantial rise in temperature of the material so that it is forced into a mold at a low temperature and is subsequently heated while in the mold to plasticize the material.

Another object of the invention is to provide an injection machine wherein preformed pellets of different size are fed through the injection cylinder of the machine according to the length of the stroke of the injection plunger of the machine so as to provide a continuous injection process using the preformed pellets alternating in such a manner that the injection plunger of the machine will advance to approximately the same position in the injection cylinder on each stroke of operation of the machine.

Another object of the invention is to provide an injection machine in accordance with the foregoing object wherein the preformed pellets are not heated during their passage through the injection cylinder, but are heated after being forced into the mold whereby either thermosetting or thermoplastic materials can be molded in the same machine and all of the material in the injection cylinder will be usable during the continuous operation of the machine.

Another object of the invention is to provide an injection machine that is constructed and arranged in a manner that a sufficient temperature differential is maintained in the plastic material in the sprue of the mold associated with the machine that the material in a part of the sprue may set and be removed with the cast article while the material in the entrance of the sprue from the injection cylinder will be at a low temperature and be retained in the sprue until the next injection cycle.

Another object of the invention is to provide an injection machine in accordance with the foregoing object wherein the plastic material in the injection cylinder is not heated during its passage through the cylinder whereby the material retained in the entrance of the sprue will remain unheated while the material in the discharge end of the sprue and in the mold will be heated and subsequently set for removal from the mold.

Still another object of the invention is to provide an injection machine for operating on a continuous cycle of operation wherein preformed pellets of plastic material of different size are fed into the injection cylinder by a mechanism that is actuated in response to the forward position of the injection plunger at the end of the injection stroke so that if the injection plunger does not reach a predetermined forward position in the injection cylinder that a preformed pellet of plastic material of smaller size will be fed into the injection cylinder than when the plunger reaches a predetermined forward position, in the latter instance a pellet of large size will be fed into the injection cylinder to thereby make up a gradually decreasing quantity of plastic material in the injection cylinder that is being used therefrom during the continuous operation of the machine as a result of variances in the density of the plastic material fed into the injection cylinder.

Another object of the invention is to provide a process of injection molding plastic materials wherein the plastic material is moved through the injection cylinder in a substantially cold condition and is transferred into a hot mold to thereby plasticize the material in the mold.

Another object of the invention is to provide a process of injection molding in accordance with the foregoing object wherein the plastic material is passed through a zone that maintains a high temperature differential between the plastic material at the entrance of the zone and the material at the discharge end of the zone so that when the material is plasticized in the mold that only a portion of the material in the temperature differential zone will be plasticized and subsequently set for removal from the mold with the cast article.

Further objects and advantages will become apparent from the drawing and the following description.

In the drawing:

Figure 1 is a longitudinal cross sectional view of a machine embodying features of this invention.

Figure 2 is a transverse cross sectional view taken along line 2—2 of Figure 1.

Figure 3 is a horizontal cross sectional view taken along line 3—3 of Figure 2.

Figure 4 is a schematic wiring diagram for the machine.

In this invention the injection machine 10, as diagrammatically illustrated, consists of a front bolster plate 11 and a rear bolster plate 12 that are interconnected by means of tie rods 13. The tie rods 13 have shoulders 14 that engage the bolster plates 11 and 12, and nuts 15 that retain the bolster plates against the shoulder 14.

The front bolster plate 11 carries a stationary mold or die member 16 that is suitably secured thereto as by means of bolts 17. An injection cylinder 18 having an internal bore 19 is disposed adjacent the stationary mold 16 and is secured thereto by means of bolts 20. A pad of heat insulating material 21 is positioned between the injection cylinder 18 and the mold 16. The heat insulating material 21 is of a type that has a relatively low heat conductivity to substantially prevent any great amount of heat transmission from the mold 16 to the injection cylinder 18 for reasons hereinafter discussed.

The injection cylinder 18 receives an injection plunger 22 that reciprocates within the cylinder bore 19. The injection plunger 22 is connected to the piston rod 23 of a double-acting hydraulic motor 24, a piston 25 being provided on one end of the piston rod 23 for reciprocation within the cylinder bore 26 of the hydraulic motor 24. Suitable fluid connections 27 and 28 are provided on opposite ends of the hydraulic motor 24 for supplying fluid through and discharging fluid therefrom as controlled by means of a conventional 4-way control valve.

The rear end of the injection cylinder 18 is connected to a support plate 29 that extends between the tie rods 13. A feed opening 30 is provided in the injection cylinder 18 to receive preformed pellets or briquettes of plastic material from the feed hopper 35 hereinafter described.

A movable mold 31 is associated with the stationary mold 16 and is carried upon the end of a ram 32 for movement to and from the mold 16. The ram 32 is provided with the piston head 33 thereon that reciprocates within the cylinder bore 34 of the hydraulic motor 36. Suitable fluid connections 37 and 38 are provided in opposite ends of the hydraulic motor 36 to supply fluid to and discharge fluid from the hydraulic motor 36 as controlled by a conventional 4-way valve.

The molds 16 and 31 are provided with passages 39 and 40 for conducting heating fluid through the mold members, suitable inlet and outlet connections 41 and 42 being provided for the passages 39 and 40. A flexible connection 43 interconnects the heating passages 39 with the heating passages 40.

The molds 31 and 16 are each provided with a recess, or recesses in the engaging faces of the mold members to provide one or more mold cavities 44 that communicate with a sprue 45. The sprue 45 has the entrance portion 46 thereof disposed in the heat insulating pad 21. Since the heat insulating pad 21 has a relatively low heat conductivity the temperature of the plastic material in the discharge portion 47 of the sprue 45 will be at a substantially greater temperature than the plastic material in the entrance portion 46 of the sprue passage 45. In fact, since the mold members 31 and 16 are heated and the injection cylinder 18 is unheated, the plastic material in the discharge portion 47 of the sprue passage 45 will be at the temperature of the mold members while the plastic material in the entrance portion 46 of the sprue passage will be at substantially the same temperature as the plastic material in the injection cylinder 18, or at least, the temperature gradient of the plastic material in the entrance portion 46 of the sprue passage 45 between opposite faces of the heat insulating pad 21 will be at substantially the same temperature of the plastic material adjacent these faces. Since the plastic material is a relatively good nonconductor of heat the plastic material in the entrance portion 46 in the sprue passage 45 will not rise in temperature rapidly due to any heat conduction from the mold members 16.

As previously stated, the injection cylinder 18 is unheated while the mold members 16 and 31 are heated. The operation of the machine as the result of the construction heretofore described with regard to the mold members and the injection cylinder is such that the plastic material advanced through the injection cylinder 18 is at a relatively low temperature, that is the temperature will not be substantially below the temperature at which the material is plasticized if the cylinder 18 is heated or in the case of thermosetting resins will be below a temperature at which polymerization proceeds rapidly, and in fact, may be approximately at room temperature. When the plastic material is forced through the sprue passage 45 by advancement of the injection plunger 22 the low temperature plastic material in the injection cylinder 18 will be forced through the sprue passage into the mold cavity 44. The mold members 16 and 31 will be maintained at a sufficiently high temperature to plasticize the plastic material within the mold cavity 44, such temperatures being in the neighborhood of 350° to 400° F. depending upon the type of plastic material that is being molded. It has been previously stated that the passages 39 and 40 are provided for the purpose of supplying a heating fluid to the molds. However, depending upon whether thermosetting or thermoplastic materials are being molded, the passages may be used for either a heating fluid or may be used alternately for a heating and a cooling fluid. The former practice will be followed when thermosetting material is used while the latter practice will be followed when thermoplastic materials are molded. It will be apparent that since the plastic material in the injection cylinder 18 is substantially at room temperature, or has not been elevated to any substantial degree, that the material in the injection cylinder 18 will not have a tendency to exude from the injection cylinder bore through the sprue 45 when the molds are opened because the material will not be in a high stage of plasticity. Under the circumstances the sprue 45 may be relatively large, and if desired may be of sufficient size to conduct flock material into the mold cavity 44. It will be understood, however, that in either condition that there will be at least a slight reduction in diameter of the sprue passage 45 from the diameter of the cylinder bore 19 to provide a line of weakness whereby the material in the sprue passage 45 will be removed with the cast article when the molds are opened.

The foregoing construction of the injection machine is especially adapted to the injection molding of thermosetting resins because of the wide differential in temperature that can be maintained in the resin retained in the entrance portion 46 of the sprue passage 45 and the discharge portion 47. Since the plastic material in the entrance portion 46 will not have any substantial rise in temperature, the material will not set or polymerize in the entrance portion of the sprue passage, whereas, the thermosetting resin in the discharge portion 47 of the sprue passage 45 will be heated to the same temperature as the material in the mold cavity 44 whereby this portion of the resin will be removed from the sprue passage 45 when the cast article is ejected from the molds.

The feeding mechanism for the machine heretofore described consists of a hopper 48 having a partition 49 disposed centrally therein wherein preformed pellets or briquettes of plastic material may be placed for feeding into the injection cylinder 18. The pellets or briquettes 50 on one side of the partition 49 are of a larger size than the pellets or briquettes 51 provided on the opposite side of the partition 49. The diameters of the briquettes 50 and 51 are the same but their lengths are different whereby the briquette or pellet 50 will contain substantially more plastic material than the pellet or briquette 51.

The pellets 50 and 51 are stacked within a hopper 48 on opposite sides of the partition 49 and rest upon a plate 52 that is supported upon the flat upper surface 53 on the injection cylinder 18. This plate 52 has an opening 54 of sufficient size to take the largest pellet 50 so that the pellet 50 can be fed into the injection cylinder bore 19 through the feed opening 30.

The plate 52 is slidably positioned upon the surface 53 and is reciprocated beneath one or the other of the stacks of pellets 50 and 51 by means of the solenoid coils $S^1$ and $S^2$. The armatures 58 and 59 of the coils $S^1$ and $S^2$, respectively, are connected to the plate 52 by means of links 60 and 61, respectively. Springs 62 and 63 surrounding the armatures 58 and 59, respectively, of the coils $S^1$ and $S^2$ maintain the plate 52 in a neutral or center position, as shown in Figure 2, when neither of the solenoids are energized. The solenoid coils $S^1$ and $S^2$ may be maintained on suitable brackets 64 and 65 extending from the center support member 29.

The electric circuit for controlling the injection machine consists of a limit switch $LS^1$ that is engaged by a cam arm 66 secured to the end of an arm 67 that is carried by the injection plunger 22 when the cam arm 66 is carried by the plunger 22 to the forwardmost position desired for the plunger 22. The limit switch $LS^1$ closes a circuit through a relay coil A, the limit switch $LS^3$ being closed at this time, whereby the contacts $A^2$ are closed and the contact $A^3$ is opened. Simultaneously contacts $A^1$ are closed thereby providing a holding circuit for relay A.

When the cam arm 66 returns on a rearward stroke it engages the roller 68 that is secured on a bell crank arm 69 for closing the limit switch $LS^2$ thereby energizing solenoid $S^1$. The cam arm 66 is of sufficient length to retain the solenoid $S^1$ energized for a sufficient time to cause the plate 52 to be moved in a leftward direction, as viewed in Figure 2, and permit a pellet or briquette 50 to drop into the opening 54 of the plate 52.

When the cam arm 66 passes rearwardly over the roller 68 and leaves contact therewith, the spring 70 will open the limit switch $LS^2$ and thereby de-energize the solenoid $S^1$ to permit the springs 62 and 63 on the armatures 58 and 59 of the solenoids $S^1$ and $S^2$ to centralize the plate 52, whereby the pellet 50 is dropped into the opening 30 in the injection cylinder.

As the plunger 22 continues its rearward movement, the cam arm 66 will finally strike the limit switch $LS^3$ thereby opening the same and de-energizing the relay coil A to now open contacts $A^1A^2$ and close contacts $A^3$ to recondition the circuit for the next cycle of operation.

The operation just described is that which occurs when the injection plunger 22 moves to its forwardmost advanced position, thereby indicating that the plastic material remaining in the injection cylinder 18 is less than that which should normally be retained therein after a cycle of operation and indicating that a large charge of fresh plastic material should be admitted into the injection cylinder to compensate for a loss of plastic material that has occurred in the operation of the machine due to variance in the weight of material that is present in the pellets 50 and 51. Under these circumstances, therefore, a large pellet 50 is dropped into the injection cylinder 18. However, this operation occurs, or a large pellet is dropped into the injection cylinder, only when the plastic material remaining in the injection cylinder is less than normally should be retained therein after an injection cycle.

The normal charge of plastic material required to fill the mold cavity 44 is contained in the pellets 51, so that if there was no variance in density of the pellets the plunger 22 would move to the same forward position at the end of each injection stroke. However, there is a variance in the density of preformed pellets so that there is a gradual accumulated loss of plastic material that remains in the injection cylinder after each stroke of operation. This loss can accumulate up to a certain point and then it is necessary to make up for this loss of material. Therefore, in what may be considered a normal operation of the machine the limit switch $LS^1$ will not be engaged by the cam arm 66 during a forward stroke of the injection plunger 22.

When the injection plunger 22 operates under this latter condition the cam arm 66 will engage the roller 68 of the limit switch $LS^2$ on a forward stroke of the plunger, in any instance, but will not close the limit switch because of the arrangement of the bell crank lever 69. If the cam arm 66 does not engage the limit switch $LS^1$ there will be no actuation of the electric circuit to condition the same as heretofore set forth. Under these conditions when the cam arm 66 is carried rearwardly by the injection plunger 22 after the completion of an injection stroke it will engage the roller 68 to close the limit switch $LS^2$. Since the contacts $A^3$ are normally closed when the contactor coil A is de-energized, the closing of the limit switch $LS^2$ will energize the solenoid coil $S^2$. Energization of solenoid $S^2$ pulls the plate 52 in a rightward direction, as viewed in Figure 2, so that a small pellet 51 having the desired quantity to fill the mold cavity 44 will drop into the feed slot 54 in the plate 52. Thus, when the cam arm moves rearwardly away from the roller 68 to permit the limit switch $LS^2$ to open, the solenoid $S^2$ will be de-energized and permit the springs 62 and 63 to centralize the plate 52 and thus cause the pellet 51 to drop into the feed opening 30 of the injection cylinder 18.

Thus, it will be seen that as long as the cam arm 66 does not strike the forward limit switch $LS^1$ that the small pellets or briquettes 51 of plastic material will be fed into the injection cylinder upon each stroke of the injection machine, and that when the accumulated loss of plastic material is such that the limit switch $LS^1$ is engaged by the cam arm 66 on the forward stroke on the injection plunger 22 that a large pellet 50 will then be fed into the injection cylinder 18. Thus, by feeding pellets or briquettes of plastic material of different size according to the position of the forward stroke of the plunger it will be seen that a substantially constant quantity of plastic material will be retained in the forward end of the injection cylinder after each stroke of operation of the injection plunger. The quantity of plastic material that remains in the forward end of the injection cylinder at the end of each stroke of operation of the injection plunger depends entirely upon the quantity desired. That is, the plunger 22 can move forwardly to a point that the cylinder is substantially exhausted of plastic material on each stroke of operation, or two or three, or more, charges of plastic material can be retained in the injection cylinder. However, in either instance the feeding mechanism will feed the desired, or selected, pellet from the hopper 48 to prevent completely exhausting the injection cylinder.

While the apparatus heretofore disclosed and described constitutes a preferred form of the invention, yet it is to be understood that the apparatus is capable of substantial mechanical alteration without departing from the spirit of the invention, and that all such modifications as fall within the scope of the appended claims are intended to be included herein.

Having thus fully described our invention what we claim as new and desire to secure by Letters Patent is:

1. An injection machine that includes, an injection cylinder having a plunger reciprocable therein, a material containing member associated with said cylinder for feeding plastic material thereto and having independent chambers therein, each of said chambers being adapted to contain pellets of preformed plastic material of a different size, means for selecting a pellet from any one of said chambers individually and independently of the other chambers, and means for selectively actuating said last mentioned means in accordance with selected different forward positions of the plunger in said cylinder.

2. An injection machine including, an injection cylinder having a plunger reciprocable therein, a material containing member having a plurality of independent chambers each of which receive pellets of plastic material of a different size, and means for automatically selectively removing a pellet from selected chambers in accordance with selected forward positions of the plunger for feeding into said cylinder.

3. An injection machine including, an injection cylinder having a plunger reciprocable therein, a material containing member having a plurality of independent chambers each of which receive pellets of plastic material of a different size, and means for automatically selectively removing a pellet from a selected chamber in accordance with one forward position of said plunger and from another selected chamber in accordance with a second forward position of said plunger for feeding into said cylinder.

4. An injection machine including, an injection cylinder having a plunger reciprocable therein, a material containing member having a plurality of independent chambers therein, each chamber having a preformed pellet of different size therein, means for feeding pellets from any one of said chambers selectively, means for actuating said feeding means to feed pellets from one only of said chambers as long as said plunger moves on a forward stroke that is short of a predetermined maximum forward stroke, in normal operation of said machine, and means for actuating said feeding means for feeding a pellet of larger size from another of said chambers in response to the predetermined maximum forward position of said plunger in said cylinder.

5. An injection machine including, an injection cylinder having a plunger reciprocable therein, and a feeding mechanism associated with said cylinder for feeding preformed pellets of plastic material of two different sizes to said cylinder which consists of, a material containing member having two independent chambers, each of said chambers adapted to contain a plurality of preformed pellets of a different size, means for selectively removing pellets from either chamber for feeding to said injection cylinder, means for actuating said selecting means for selecting small pellets from one of said chambers for feeding to said injection cylinder during normal operation of said plunger, and means for actuating said selecting means for selecting a large pellet from said other chamber for feeding to said injection cylinder when said plunger advances in said cylinder to a predetermined maximum forward position.

6. An injection machine including, an injection cylinder having an injection plunger reciprocable therein, a material retaining means having a plurality of independent chambers, each chamber containing a preformed pellet of plastic material of different size, means for selecting a preformed pellet from any one of said chambers for feeding to said injection cylinder, actuating means for said selecting means, and means for actuating said actuating means in response to a return stroke of said injection plunger to feed a pellet from a preselected chamber.

7. An injection machine including, an injection cylinder having an injection plunger reciprocable therein, a material retaining means having a plurality of independent chambers, each chamber containing a preformed pellet of plastic material of different size, means for selecting a preformed pellet from any one of said chambers for feeding to said injection cylinder, actuating means for said selecting means, means for actuating said actuating means in response to a return stroke of said injection plunger to feed a pellet from a preselected chamber, and means operated in response to a predetermined forward position of said injection plunger to actuate said actuating means for selectively operating said selecting means for selecting a pellet from another of said chambers for feeding to said injection cylinder.

8. An injection machine including, an injection cylinder having an injection plunger reciprocable therein, a material retaining means having a plurality of independent chambers, each chamber containing a preformed pellet of plastic material of different size, means for selecting a preformed pellet from any one of said chambers for feeding to said injection cylinder, actuating means for said selecting means, means for actuating said actuating means in response to a return stroke of said injection plunger to feed a pellet from a preselected chamber, means operated in response to a predetermined forward position of said injection plunger to actuate said actuating means for selectively operating said selecting means for selecting a pellet from another of said chambers for feeding to said injection cylinder, and means operated by a predetermined rearward position of said injection plunger to render said last mentioned means inoperative for a succeeding forward stroke of said injection plunger and until said last mentioned means is again operated by said plunger reaching its predetermined forwardmost position.

9. The method of feeding preformed pellets of plastic material to the injection cylinder of an injection machine to maintain a substantially constant residual quantity of plastic material within the injection cylinder after each stroke of operation of the injection plunger of the injection machine that includes, operating a feeding mechanism for continuously selecting preformed pellets having a predetermined charge therein substantially equal to the quantity of material to fill a mold cavity from other pellets having a predetermined charge therein that is substantially greater than that required to fill a mold cavity and feeding them into the injection cylinder upon each stroke of operation of the injection plunger as long as it stops short of a predetermined forward position in the injection cylinder, and automaticaly selecting a preformed pellet having a predetermined charge therein that is substantially greater than that required to fill a mold cavity each time the injection plunger reaches said predetermined forward position in the injection cylinder and feeding it thereinto.

DON C. YOUNGBLOOD.
BERNARD D. ASHBAUGH.